Figure 1:
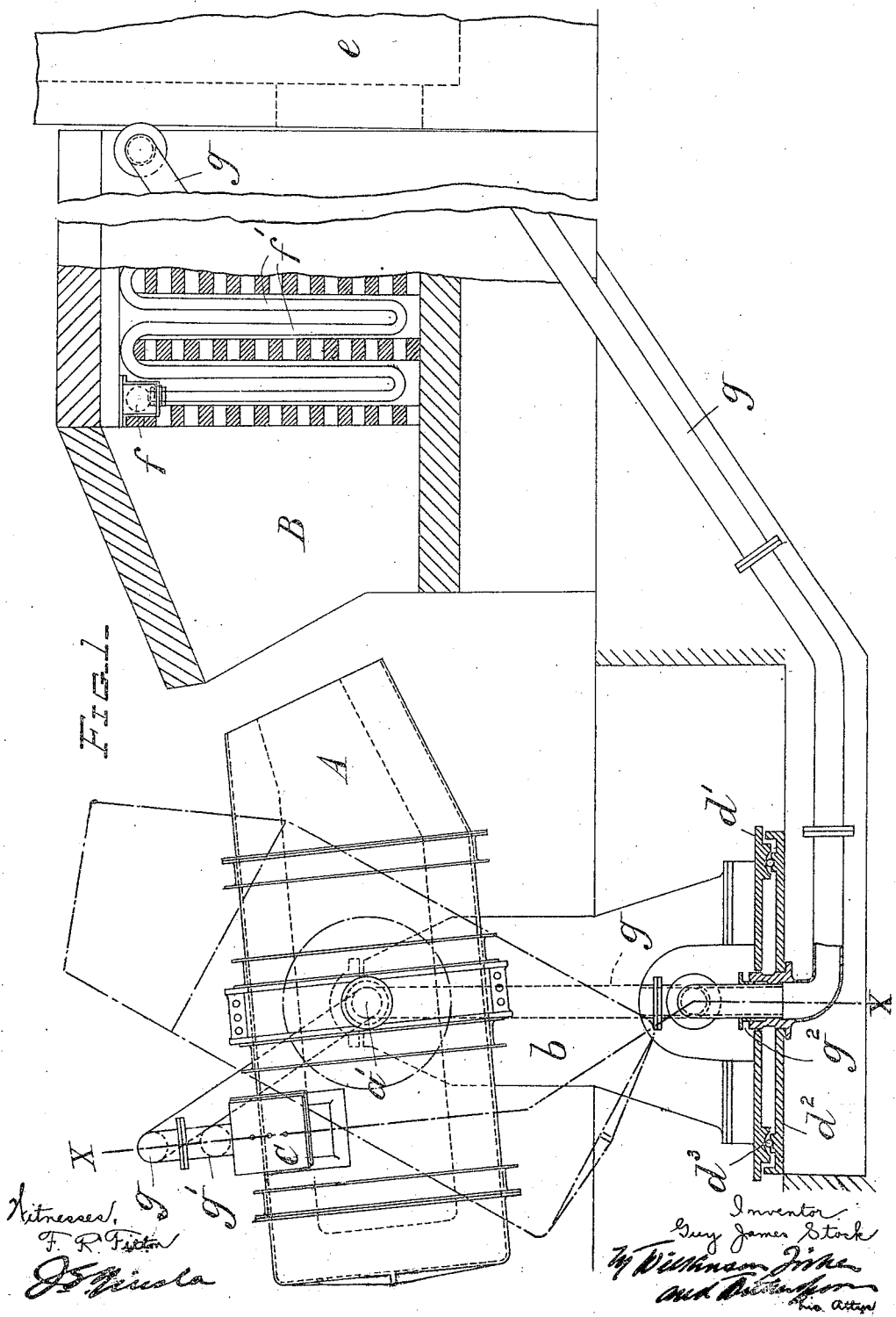

G. J. STOCK.
PROCESS FOR THE MANUFACTURE OF STEEL.
APPLICATION FILED JULY 1, 1909.

933,596.

Patented Sept. 7, 1909.

4 SHEETS—SHEET 3.

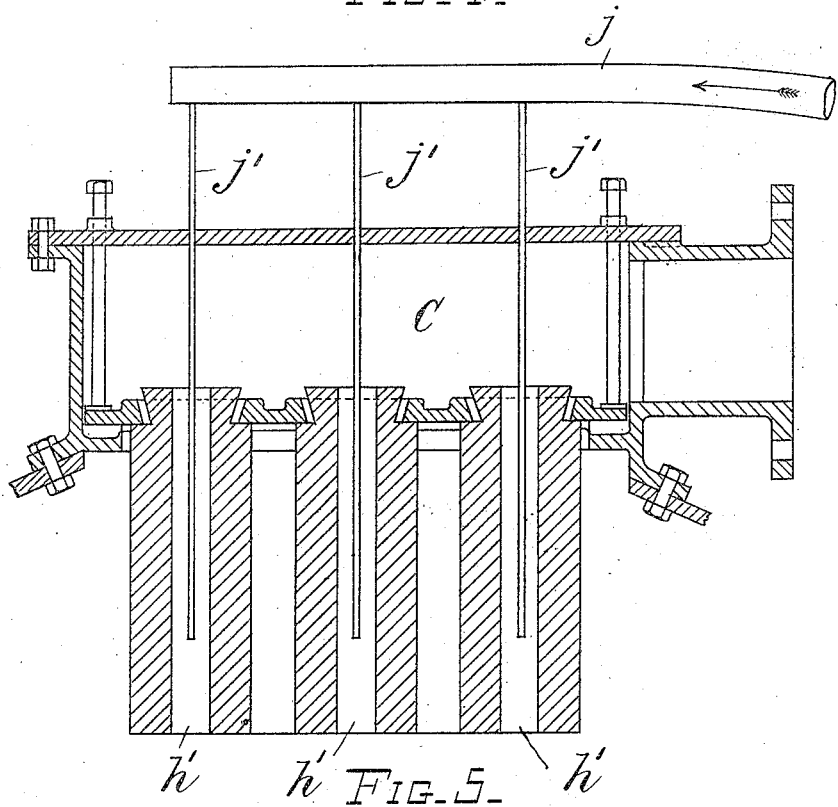
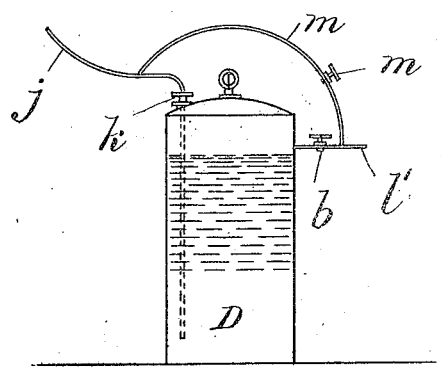

UNITED STATES PATENT OFFICE.

GUY JAMES STOCK, OF DARLINGTON, ENGLAND.

PROCESS FOR THE MANUFACTURE OF STEEL.

933,596.

Specification of Letters Patent. Patented Sept. 7, 1909.

Application filed July 1, 1909. Serial No. 505,473.

*To all whom it may concern:*

Be it known that I, GUY JAMES STOCK, a subject of the King of Great Britain and Ireland, residing at Cockerton Hall, Darlington, county of Durham, England, have invented certain new and useful Improvements in Processes for the Manufacture of Steel; and I do hereby declare the following to be a full, clear, and exact description of the invention, such as will enable others skilled in the art to which it appertains to make and use the same.

My invention consists in a novel or improved process for producing steel, in which the material to be reduced to steel, instead of being melted in a cupola or other melting furnace and charged into the converter vessel in a molten state, is melted in the converter vessel itself, into which it is charged in the form of pig iron, scrap, or the like materials in the same condition as it would be charged into a cupola. The converter being provided in the usual way with the requisite lining of refractory material is also provided with means for the injection of air through twyers in conjunction with a series of jets for the injection of liquid fuel such as oil spray or gas, so that a high temperature of combustion of the mixture of air and oil spray, or air and gas, or a mixture of all these, is set up, the heat from the combustion so produced being applied to melt the pig iron and scrap, with which the converter has been previously charged. When these materials are properly melted, the jets of oil or gas are turned off and the injection of air continued, by which the molten carbid of iron is converted to steel in the ordinary way. But in order to inject heated air into the converter, I provide air heating chambers which I term economizers, in which the air is conveyed through a series of passages or tubes heated by the waste heat, which escapes from the nose of the converter during the preliminary heating up of the vessel and the melting of the charge. In order to effect this, the converter underframe is so mounted on a turntable that it can rotate on its vertical axis. This enables the converter to be set in one direction for the purpose of charging it with the material to be melted, and afterward to be set with its nose opposite to the economizer, the economizer being in design, capacity and position, adapted for the purpose. A second economizer is preferably provided to be used as a substitute when required. In consequence of the turntable movement of the underframe, the blast main from the economizer to the blast box is carried through a stuffing box in the center of the turntable to admit of this movement. The ordinary or trunnion rotation of the converter being carried out in the usual way except that the blast being hot is not carried through the trunnions.

The several parts having been arranged as thus indicated in general terms, the apparatus is adapted for the following process. The converter vessel having been turned away from the economizer and laid horizontal, is charged about one third full with burning wood. It is then turned so that the nose points into the economizer and the air blast turned on, which fans the wood with a good flame, thereby warming up the inside of the vessel. This is continued for a short time, say for 10 minutes, when the jets of oil or gas, or a mixture of these are turned on in a manner suitable to obtain complete combustion with a full blast of air, the intended result being judged from the flame discharged from the nose of the vessel. But for simplicity of description, I shall refer to oil jets only, from the application of which the requisite generation of heat for combustion will be clearly understood. After a time, say half an hour, the vessel becomes white hot and the economizer begins to supply hot blast. It is then turned away from the economizer, the fuel and air turned off and charged with scrap and pig iron, with the scrap preferably placed toward the back, and when so charged, the vessel is again turned toward the economizer as before. The air blast and oil being turned on and regulated as required, the charge in due course, say an hour or so, is melted, and when it has been ascertained that the melting process is complete and the charge ready to blow, the vessel is turned up into a vertical position, the oil turned off, and the full blast of heated air through the twyers is turned on, cold air being also passed through the oil tubes to keep them cool. The usual process of conversion then takes place, during which the waste heat is allowed to escape into the open, so that the economizer is not injured by the slag formed during conversion, after which the vessel is turned down, and its molten contents poured out into a ladle or other receptacle.

Although the process above described will be subject to variation more or less according to circumstances, the skilled steel maker will readily understand therefrom how my invention is intended to be applied and carried into effect, and that the advantages incidental thereto are as follows:—Economy in the production of steel, the metalloids and manganese being more quickly reduced by the use of hot air instead of cold and the process accelerated by the increased temperature allowing the charge to be blown with less percentage of silicon and manganese which decreases the percentage loss on the charge. Furthermore, the quality of the steel produced depends mainly on that of the ingredients charged into the converter, and is not liable to be detrimentally affected by the use of impure fuel in the cupola or other melting furnace. Also the operator has the heat under entire control at all stages of the process. But in order that suitable apparatus may be provided, erected and operated as required for the purpose of my invention, I will now proceed to further describe the same, and for that purpose shall refer to the annexed sheets of drawings forming part of this specification, it being understood that the invention is not restricted to the actual construction or arrangements of the parts or details shown, so long as such construction and arrangement of the several parts or details permit of, or is adapted for conveniently carrying out the process of steel making essentially as hereinbefore set forth.

Figure 2:
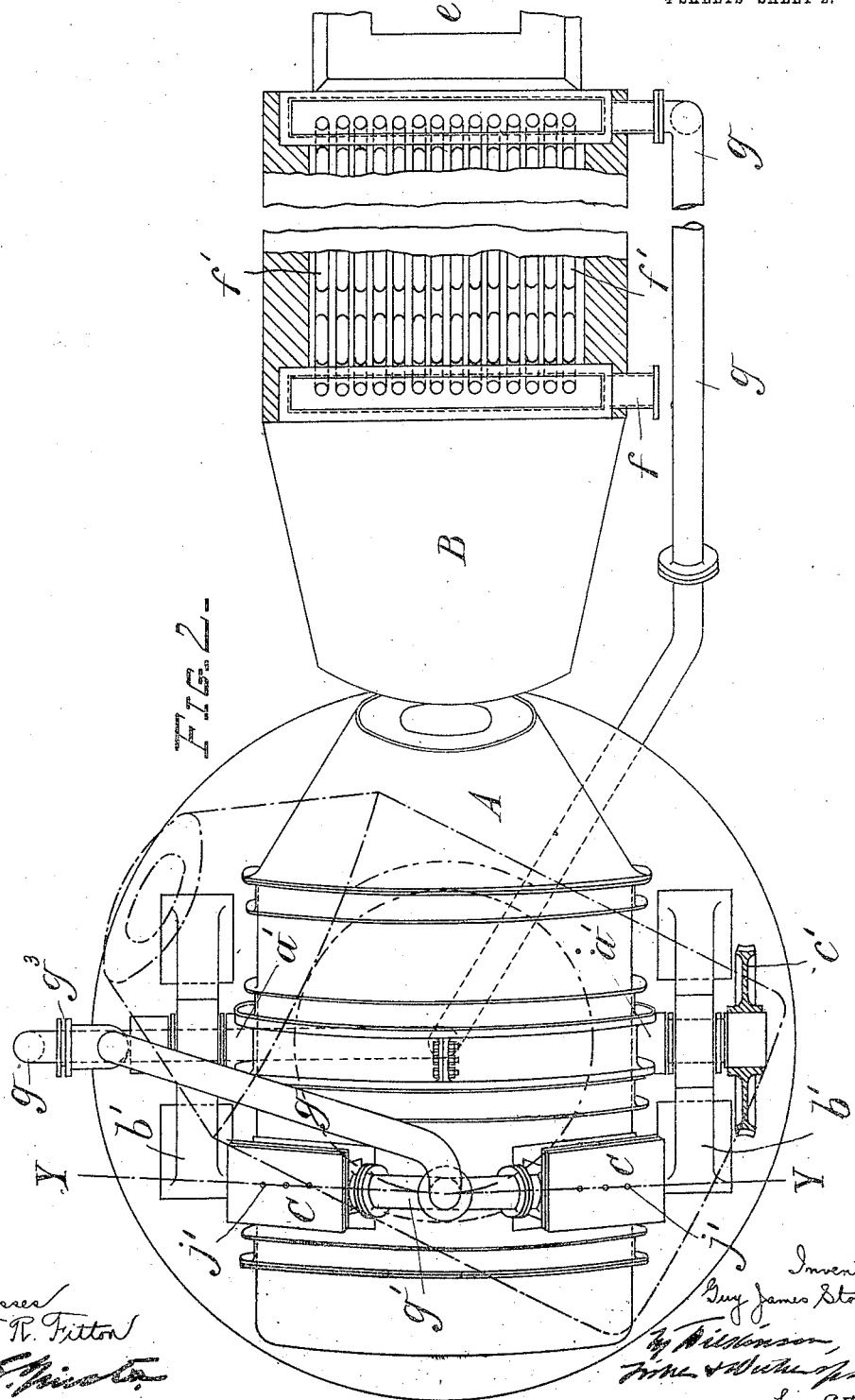
Figure 3:
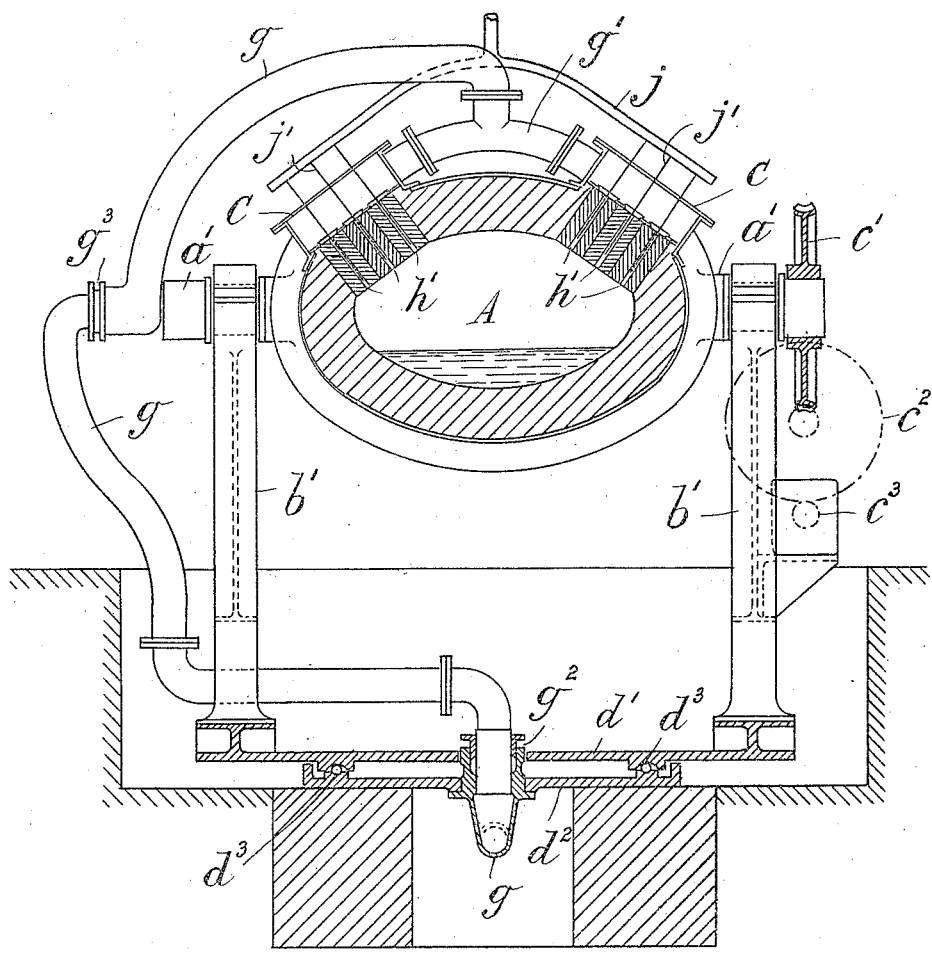

In the drawings, Figure 1 is a view mainly in elevation, but partly in section of such an apparatus in its entirety, the converter and economizer appearing in their relative operative positions. Fig. 2 is a plan view, also partly in section corresponding to Fig. 1. Fig. 3 is a transverse sectional view taken on line X—X of Fig. 1 or line Y—Y of Fig. 2 in respect of the converter vessel and certain of its accessory parts, Fig. 4 being a detail view drawn to a larger scale and mainly in section showing arrangement of blast box and its connections, including the oil injection tubes and the oil delivery pipe, from which they are supplied. Fig. 5 is a diagrammatic view on a small scale of an oil storage tank or reservoir, from which the oil is charged into the oil supply pipe by pressure, provision being made for turning off the oil supply from the converter at will, and passing cold air through the oil jets under pressure as required.

A is the converter or vessel in which the materials such as pig and scrap iron are converted and is preferably oval in section, as in this form a larger surface of the contents is exposed to the action of the hot gases for melting.

B is the economizer or chamber in which the air charged into the converter is heated beforehand by the waste heat discharged from the said converter during the period of melting.

C C are the air blast twyer boxes and their connections.

D is the oil storage tank or reservoir and its connections.

The converter vessel is mounted on trunnions $a'$ $a''$ journaled into the standards $b'$ $b'$, $c'$ $c^2$ $c^3$ representing an arrangement of any suitable gearing such as worm gearing for turning the converter A on its trunnions as required by the process, that is to say, from the steel conversion position shown in dotted lines to the melting position shown in full lines as shown in Fig. 1. The standards $b'$ $b'$ are erected on the platform or girder beam $d'$ of a turntable and with the standards $b'$ $b'$ forms the underframe of the converter.

$d^2$ is the turntable bed plate, on which is provided a circular groove or track $d^3$ provided with ball bearings as shown, the platform or girder beam $d'$ being correspondingly furnished with grooves or recesses to enable the converter to be rotated to the right or left on its vertical axis, for which suitable gearing is provided if required but not shown.

The economizer B is provided with a system of pipes, checker work, or a combination of these for absorbing the waste heat from the converter when turned toward it as shown in Fig. 1, $e$ being a chimney or uptake for drawing the hot gases through it. Air from the blowing engine is delivered into the economizer at $f$ and passing through a system of pipes such as $f'$, travels at a high temperature along a pipe $g$ to the converter terminating in a two-way branch pipe $g'$ leading into the blast boxes C C, and through the twyers $h'$ into the converter. But to accommodate the rotating movements of the converter, two stuffing boxes are provided and formed in the usual way by the aid of asbestos packing, one stuffing box being in at $g^2$, where the air pipe passes through the turntable in line with the vertical axis of the converter, and the other at $g^2$ in line with the trunnions axis.

$j$ is the oil supply pipe and $j'$ are small oil jets extending therefrom into the twyers $h'$. The oil pipe is supplied from any convenient or available source under pressure such as an oil storage tank D as shown in Fig. 5, the transmission pipe $j$ being flexible on account of the movements of the converter.

$k$ represents an oil valve, and $l$ an air valve, so that the discharge of oil into the oil pipe $j$ can be turned on or off at will, and by means of valve $l$, the pressure of air for driving the oil through to the twyers is regulated as desired, $l'$ being the air supply pipe to the oil storage tank. In order to drive air through the oil injectors to keep them cool, when the oil is shut off a by-pass m with controlling valve m' is provided to afford a direct communication between pipes l' and j.

The above described oil tank and its connections form no part of my invention, but are only intended to show in what way and subject to what control, the oil required for combustion in the converter may be conveniently supplied for the purposes of my invention.

Having thus described my invention, what I desire to claim and secure by Letters Patent in the United States, is:—

1. In the production of steel by means of a Bessemer or pneumatic converter arranged in connection with an economizer, the process of melting the iron and passing the products of combustion through the economizer, then moving the converter and converting the iron therein into steel, allowing the products of combustion to go to waste, and heating the air supply for each operation by the economizer, substantially as described.

2. In the production of steel by means of a Bessemer or pneumatic converter arranged in combination with an economizer, the process of melting a charge of metal in said converter by means of fuel forced into said converter through the twyers thereof, allowing the hot products of combustion to pass through the economizer, then tilting the converter and blowing air therethrough, and heating the air by the economizer during the blowing operation, substantially as described.

In testimony whereof I affix my signature in presence of two witnesses.

GUY JAMES STOCK.

Witnesses:
 ROBERT W. PEARSON,
 THOMAS ERNEST HULL.